United States Patent
Klosowski et al.

(10) Patent No.: US 9,479,358 B2
(45) Date of Patent: Oct. 25, 2016

(54) MANAGING GRAPHICS LOAD BALANCING STRATEGIES

(75) Inventors: James T. Klosowski, Hawthorne, NY (US); Christopher J. Morris, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 12/465,326

(22) Filed: May 13, 2009

(65) Prior Publication Data

US 2010/0289803 A1 Nov. 18, 2010

(51) Int. Cl.
*G06F 15/16* (2006.01)
*H04L 12/64* (2006.01)

(52) U.S. Cl.
CPC ................ *H04L 12/6418* (2013.01)

(58) Field of Classification Search
USPC .......................................... 345/505
See application file for complete search history.

(56) References Cited

U.S. PATENT DOCUMENTS

| | | | |
|---|---|---|---|
| 6,191,800 B1 | 2/2001 | Arenburg et al. | |
| 6,753,878 B1 | 6/2004 | Heirich et al. | |
| 7,075,541 B2 * | 7/2006 | Diard ............................. | 345/505 |
| 7,516,181 B1 * | 4/2009 | Du ..................... | H04L 67/1008 709/205 |
| 7,800,619 B2 * | 9/2010 | Bakalash et al. ............. | 345/502 |
| 7,882,501 B1 * | 2/2011 | Carlson et al. ................ | 717/167 |
| 2005/0225552 A1 | 10/2005 | Anand | |
| 2006/0267992 A1 * | 11/2006 | Kelley et al. ................. | 345/502 |
| 2009/0002263 A1 | 1/2009 | Pasetto | |
| 2009/0113172 A1 | 4/2009 | Deneroff et al. | |
| 2010/0289803 A1 * | 11/2010 | Klosowski et al. .......... | 345/502 |

OTHER PUBLICATIONS

Samanta, Rudrajit, J. Zheng, T. Funkhouser, K. Li and J. Singh, "Load Balancing for Multi-Projector Systems", Graphics Hardware 1999, pp. 107-116, Los Angeles, USA, 1999.
Whitman, Scott, "A Task Adaptive Parallel Graphics Renderer", 1993 Symposium on Parallel Rendering, pp. 27-34, San Jose, USA, 1993; and.
Whitman, Scott, "Dynamic Load Balancing for Parallel Polygon Rendering", IEEE Computer Graphics and Applications, vol. 14, No. 4, pp. 41-48, Los Alamitos, USA, 1994.

* cited by examiner

*Primary Examiner* — Kyle Zhai
(74) *Attorney, Agent, or Firm* — Scully, Scott, Murphy & Presser, P.C.; Daniel P. Morris, Esq.

(57) ABSTRACT

A method and system for managing graphics load balancing strategies are disclosed. The method comprises using a plurality of rendering servers to render a multitude of graphics frames for a display device, wherein each of the rendering servers has an associated workload; identifying a plurality of load balancing strategies for balancing the workloads on the rendering servers; selecting one of the load balancing strategies; and using the selected one of the load balancing strategies to balance the workloads on the rendering servers. One or more defined metrics are monitored; and in response to a defined changed in said one or more defined metrics, another one of the load balancing strategies is selected and used to balance the workloads on the rendering servers. In one embodiment, the load balancing policy can be changed in real-time during the course of an application session.

20 Claims, 5 Drawing Sheets

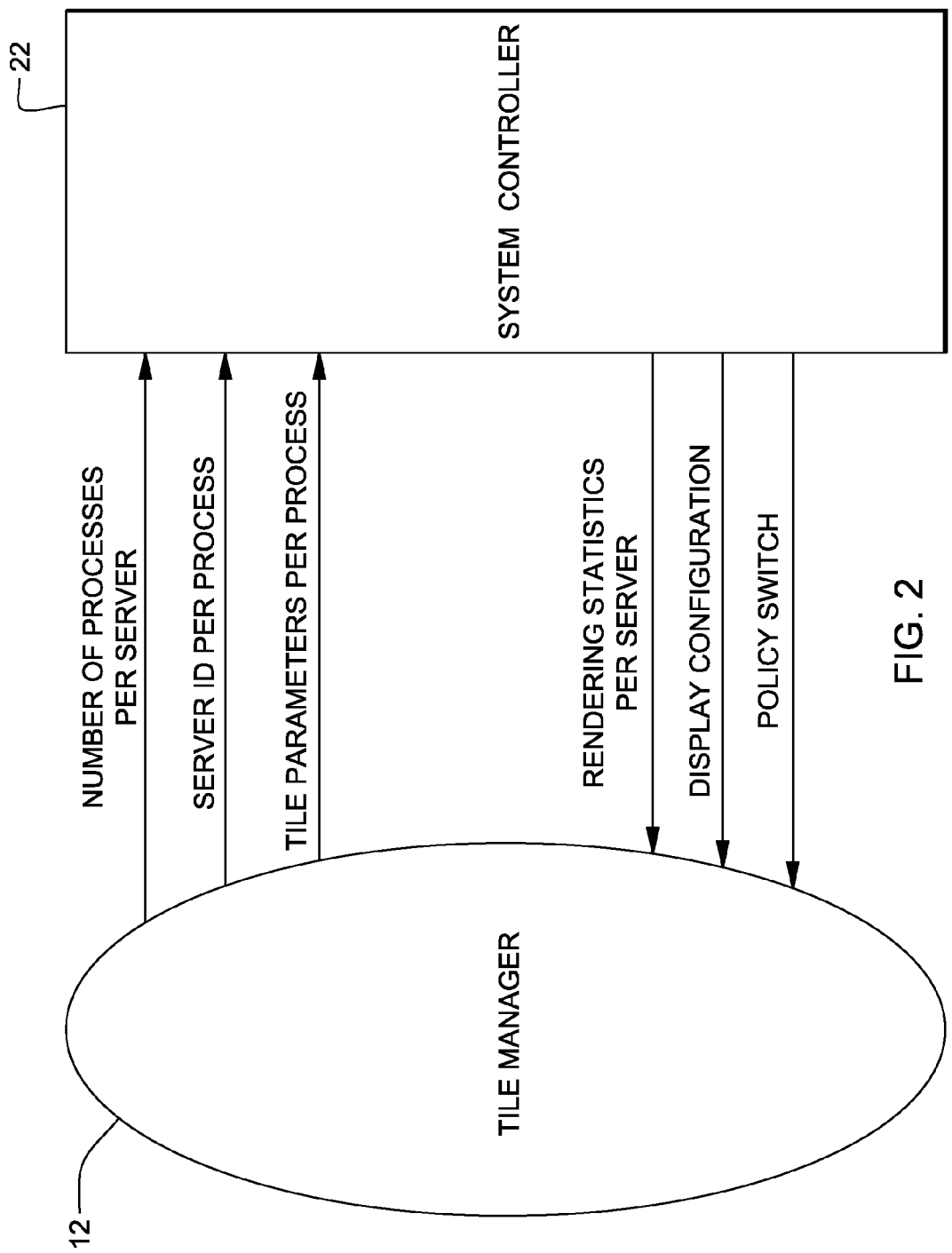

TILE MANAGER

MANAGED INFORMATION
- LOAD BALANCING POLICIES
- LIST OF RENDERING, DISPLAY, AND HYBRID SERVERS
- DISPLAY CONFIGURATION INFORMATION
- PROCESS (TILE) INFORMATION

FUNCTIONALITY
- OBTAIN PERFORMANCE STATISTICS PER FRAME
- OBTAIN DISPLAY CONFIGURATION INFORMATION
- ADD NEW POLICIES, SERVERS, AS NEEDED
- IMPLEMENT CURRENT POLICY USING RETRIEVED DATA
  - REASSIGN PROCESSES OR TILES
  - SPLIT PROCESSES OR TILES
- IMPLEMENT NEW POLICIES AS DICTATED
  - BY RETRIEVED DATA
  - BY USER COMMAND
- RETURN UPDATED PROCESS/TILE INFO TO SYSTEM
- NEW ASSIGNMENTS
- NEW PARAMETERS

FIG. 3

MANAGING GRAPHICS LOAD BALANCING STRATEGIES

CROSS-REFERENCE TO RELATED APPLICATIONS

This application is related to application Ser. No. 12/465,357, filed herewith, now abandoned, the disclosure of which is herein incorporated by reference in its entirety.

BACKGROUND OF THE INVENTION

1. Field of the Invention

The present invention generally relates to data processing, and more specifically, the invention relates to graphics processing using a plurality of rendering servers. Even more specifically, the invention relates to managing graphic load balancing strategies for the rendering servers.

2. Background Art

Computer applications have been developed that present graphic-intensive data processing, including real time video animation in which an image may be refreshed at rates up to thirty times a second. The presentation of such information can often strain the abilities of a computer system, since it may take a significant amount of processing work for the computer system to refresh the display screen at the desired rate.

One strategy for handling this workload is to utilize multiple concurrent rendering processors to perform animation. A computer program can be separated into a collection of processes that are executed by the processors. One possible way in which the work may be distributed among the available rendering processors is to subdivide the display into multiple regions, referred to as tiles, and then assign one or more tiles to each process.

Increasingly, computer graphic systems are being designed, constructed, and utilized that employ a collection or cluster of rendering servers to render to either a single display or to some sort of "tiled" display (comprised of multiple logical or practical displays). These clustered rendering systems are increasing in popularity due to the availability of their commodity components and their ability to effectively use the aggregation of the servers' resources. However, care must be taken to ensure that the resources of each individual server are being efficiently used.

For example, any application running on such a clustered rendering system should adjust the distribution of its rendering tasks to the individual rendering servers so that there is not an appreciable load imbalance between the rendering servers. Such an imbalance has the potential to limit the performance and utility of the overall application.

Strategies for distributing data have been developed so that the appropriate data is sent to and rendered by the rendering server that is attached to the display, on which, the rendered data will be viewed. This approach, commonly referred to as the "sort-first" distribution strategy, has proven to be effective at taking advantage of the rendering capability of each server and balancing out the rendering load fairly well, especially for relatively static scenes where the data is evenly distributed across the displays and their associated servers.

However, if the scene is manipulated in such a way that large portions of the data can fall in the boundaries of one or a few displays, it readily becomes apparent that simply redistributing the data to the appropriate rendering server is no longer sufficient. In these scenarios, due to the fact that rendered pixels of the data all resides on a minority of the displays, then only a minority of the rendering servers will be doing any work while the other servers sit idle.

To address these situations, several researchers have developed techniques for dynamically partitioning the display regions so that these smaller partitions can be assigned so that servers that were doing little to no work in the previous frame can now be given regions of the display to render that require a lot of work. These techniques distribute the rendering loads more evenly and require feedback from the rendering servers in order to perform their repartitioning and reassignments. Typically, this feedback is in the form of performance measurements such as the time it takes a server to send its data to another server or the time it takes a server to render and display its data. If these performance values exceed a particular threshold, the rebalancing algorithms are triggered.

Each of these balancing "policies" differ in the way they partition the screen space or "tiles," which performance metrics they evaluate, and how they use these metrics to "rebalance" the screen and reassign partitions and data to other nodes. Although each of these policies is effective for certain scenarios, there are scenarios where they are not effective and other policies are warranted. These scenario characteristics include (but are not limited to): size and nature of the data to be rendered, size of the display to be rendered to, single display vs. tiled display, number of display attached rendering servers vs. "stand-alone" (rendering servers which will ship their resulting pixels to a server attached to a display), application usage patterns, and number of total rendering servers.

Each of these characteristics can significantly affect the efficiency of each individual load balancing policy. Samanta, et al, in "Load Balancing for multi-projector systems," Graphics Hardware 1999, pp 107-116. describe this behavior in the experimental testing of their own load balancing algorithms. Consequently, if one were to design a system for doing efficient and high performing distributed rendering that was adaptable to both the hardware and software characteristics of the applications to be run or the cluster unit that it is running on, there needs to be a mechanism in place to change the load balancing policy. A system that was able to change the load balancing policy in real-time and according to the user's discretion or based on the nature of the application and resource environment would be at a significant utility advantage to those systems that are unable to adapt appropriately.

SUMMARY OF THE INVENTION

Embodiments of the invention provide a method, system and computer program product for managing graphics load balancing strategies. The method comprises using a plurality of rendering servers to render a multitude of graphics frames for a display device, wherein each of the rendering servers has an associated workload; identifying a plurality of load balancing strategies for balancing the workloads on the rendering servers; selecting one of the load balancing strategies; and using the selected one of the load balancing strategies to balance the workloads on the rendering servers. One or more defined metrics are monitored; and in response to a defined change in said one or more defined metrics, another one of the load balancing strategies is selected and used to balance the workloads on the rendering servers. In one embodiment, the load balancing policy can be changed in real-time during the course of an application session.

An embodiment of the invention implements a tile managing system which has several functions. The manager has multiple load balancing strategies for which it can choose from. The manager initializes the system by providing the initial display tile partitions and assignments for each rendering server, acting as a monitor of the performance feedback from each rendering server, and repartitioning, resizing, and or reassigning the partitions based on the performance feedback and the load balancing policy in use.

The load balancing policy can be changed in real-time during the course of an application session. The policy can be changed at the request of the application user or based on a combination of other system inputs such as the rendering server performance metrics or the display and rendering server configuration. For example, if a policy is being employed that reassigns the partitions, on a per-frame basis, based on the rendering times of each rendering server, and it is determined through extended monitoring by the tile manager that the communication (of sending data between the rendering servers) times are the current bottleneck, the tile manager could switch to a policy that simply assigns the partitions and does not reassign them.

If the performance metrics later suggest that the behavior is changed (due to new application usage patterns), the tile manager can switch back to the previous policy. As a result, the tile manager can provide any distributed rendering application with the ability to adjust to such factors as the application usage patterns, the size and nature of the data to be rendered, the display configuration, and the amount and type of rendering resources that are available.

BRIEF DESCRIPTION OF THE DRAWINGS

FIG. 2 shows information that may be transmitted between the Tile Manager and the System Controller of the rendering system of FIG. 1.

FIG. 3 lists information that may be used by and functions that may be performed by the Tile Manager.

DETAILED DESCRIPTION OF THE PREFERRED EMBODIMENTS

Figure 1:
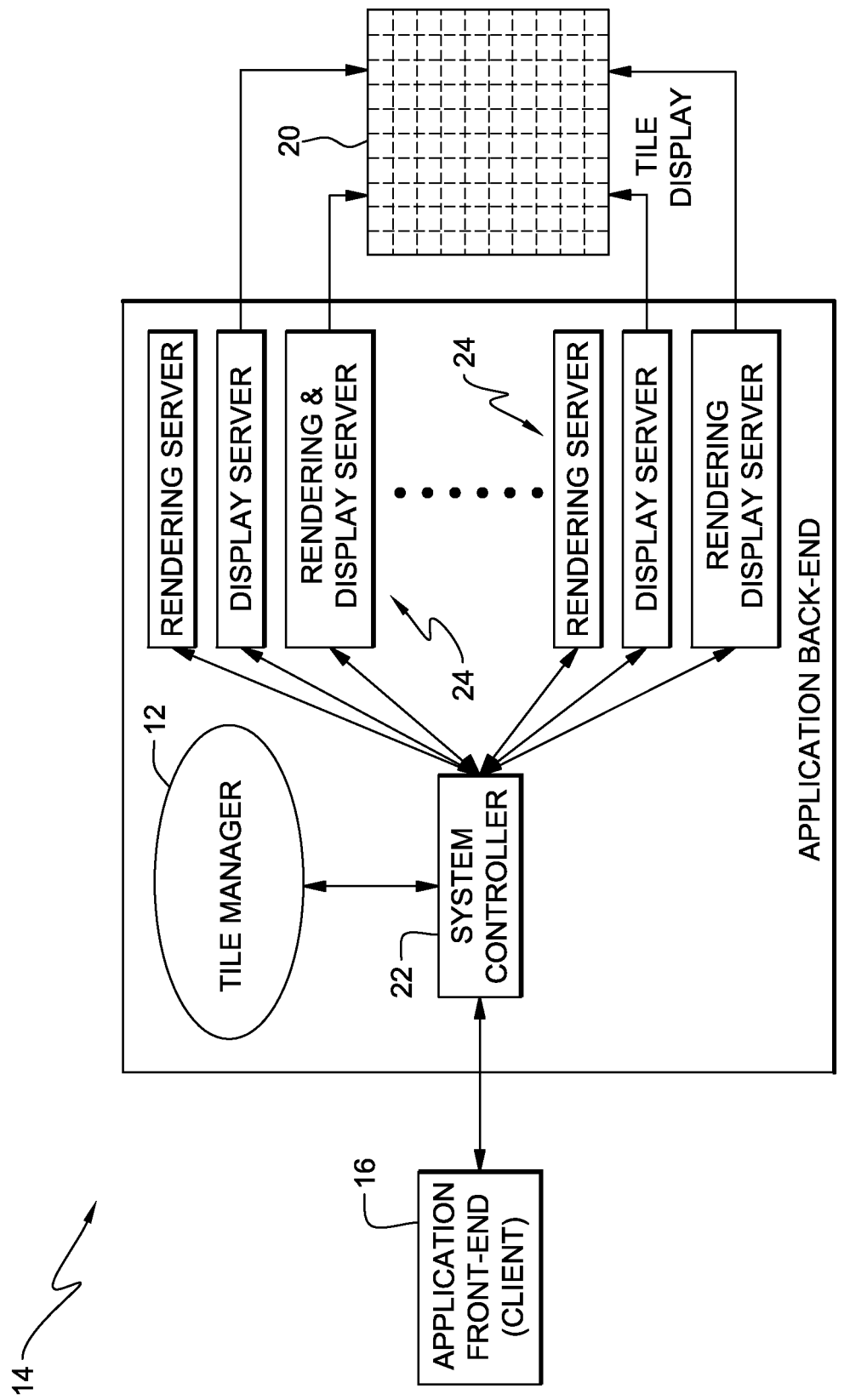
FIG. 1 generally illustrates a rendering system in which an embodiment of the present invention is implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention relates to a data processing system that speeds up generation of graphic images by utilizing multiple concurrent rendering processor services to refresh a video display. The present invention dynamically balances the graphics workload among the available rendering processes; and, as part of this balancing, the display is subdivided into multiple regions or tiles, and each rendering process is assigned one or more of these tiles.

In one embodiment, a Tile Manager 12 is used to implement a number of functions. With reference to FIG. 1, the tile Manager is a component of a larger distributed or parallel rendering system 14. In running an application on such a system, the user would interact with the application via a "front-end" client 16 that accepts user input and potentially displays the final rendered pixels. Alternatively, the rendered pixels could be displayed on a larger tile display 20. The user input is sent from the front-end client to a system controller 22 which then processes the input and sends it to the multiple "back-end" servers 24 where appropriate. Sample user input may be commands to open a data set, render the data set, and modify the direction in which to view the data. The System Controller 22 keeps track of which servers are rendering servers (responsible for rendering the data), display servers (responsible for displaying the data), or both. Information such as the camera and viewport parameters are examples of what the System Controller maintains and passes to each server. The Tile Manager apparatus communicates exclusively with the System Controller 22.

With reference to FIGS. 1 and 2, the System Controller passes information to the Tile Manager, and this information is then used to manage the tiles with the resulting information being passed back to the System Controller. The System Controller sends the following information to the Tile Manager: the display configuration; the performance statistics for each server; and user-defined load balancing policy information.

The display configuration includes which servers are rendering servers, display servers, or both. This information may include (but is not limited to) the global display characteristics such as the global viewport parameters. The System Controller could also be designed to pass user-defined window parameters, such as the number of tile partitions and the partition configuration.

The performance statistics for each server may include (but are not limited to) the time, for the previous frame, to render the data, to display the data, to read back and send rendered pixels to another server (if rendering server is not a display server as well), etc. The System Controller may be constructed to accept new load balancing policies from the user, and the user may be able to dictate which policy should be used.

The Tile Manager sends the following information to the System Controller: the number of processes (encompassing display tiles) that each server is responsible for; the ID of the server that is responsible for each process; and the tile parameters (width, height, global offset, etc.) associated with each process.

A process is an entity that comprises a region of the overall display (or tile), the server that was responsible for that process for the previous frame, and the performance statistics associated with the process for the previous frame. With reference to FIG. 3, the Tile Manager manages several data items including all of the processes for a particular application session. The Tile Manager also manages the load balancing policies. Each load balancing policy is comprised of smaller subsystem that accepts information about the display configuration, process information, and performance statistics and uses this information to implement a particular load balancing algorithm.

Each policy has a common interface so that the Tile Manager can easily pass the same information to each policy. The Tile Manager also maintains a list of all of the rendering servers, display servers, and combination (both rendering and display) servers as well as the global display configuration information. This information includes (but is not limited to) the global viewport, whether a tiled display is being used or not, how each display comprises the overall display, and which servers are responsible for which display. The Tile Manager uses this information to perform its numerous functions.

These functions include (but are not limited to): obtaining the performance statistics for each server from the System Controller; obtaining updated display configuration information from the System Controller; obtaining user input such as display configuration or a request to change policies from the System Controller; adding or removing load balancing policies and servers as needed; using the obtained data, determining whether or not a new load balancing policy should be implemented; implementing the current load balancing policy by running the associated load balancing algorithm using the current process information; and sending the results of the load balancing algorithm (in the form of new process information) back to the System Controller.

Figure 4:
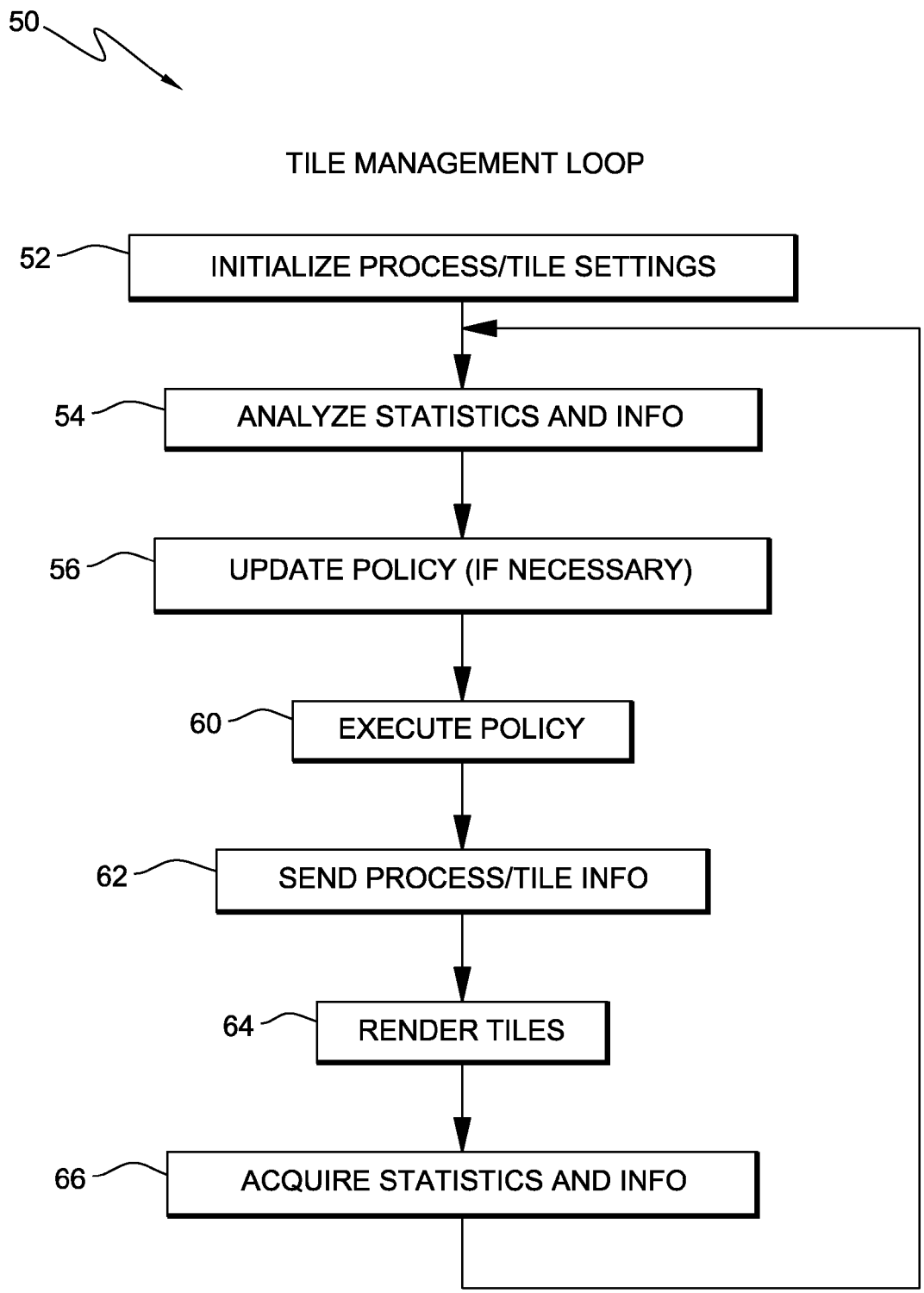
FIG. 4 depicts an execution loop performed by the Tile Manager in an embodiment of the invention.

FIG. 4 shows an execution loop 50 performed by the Tile Manager 12. At step 52, the Tile Manager initializes the process (tile) settings to default values. At step 54, the Manager analyzes performance statistics and additional information provided by the System Controller (if there are any) to determine if a new load balancing policy is needed. At step 56, the Manager updates/changes the policy if needed. At step 60, the current load balancing policy is executed using acquired information; and at step 62, the resulting process (tile) information is sent to the System Controller. At step 64, the System Controller executes the rendering of the next frame; and at step 66, the Tile Manager obtains new performance statistics and additional information from the System Controller. Steps 54-66 are repeated until the application ceases.

An embodiment of the invention has been implemented in an SPVN (Scalable Parallel Visual Networking) API. The Tile Manager was written as a C++ class using a well understood design pattern. However, embodiments of the invention could be implemented in other programming languages or even in hardware. Due to the common interface between the load balancing policies, the Tile Manager can quickly switch between policies in real-time during the operation of an application. The implementation of this invention provides the capability for SPVN (or distributed rendering systems) to be highly adaptable to not only the system configuration that the application is running on, but also to the usage patterns and necessary tasks of any rendering application.

Figure 5:
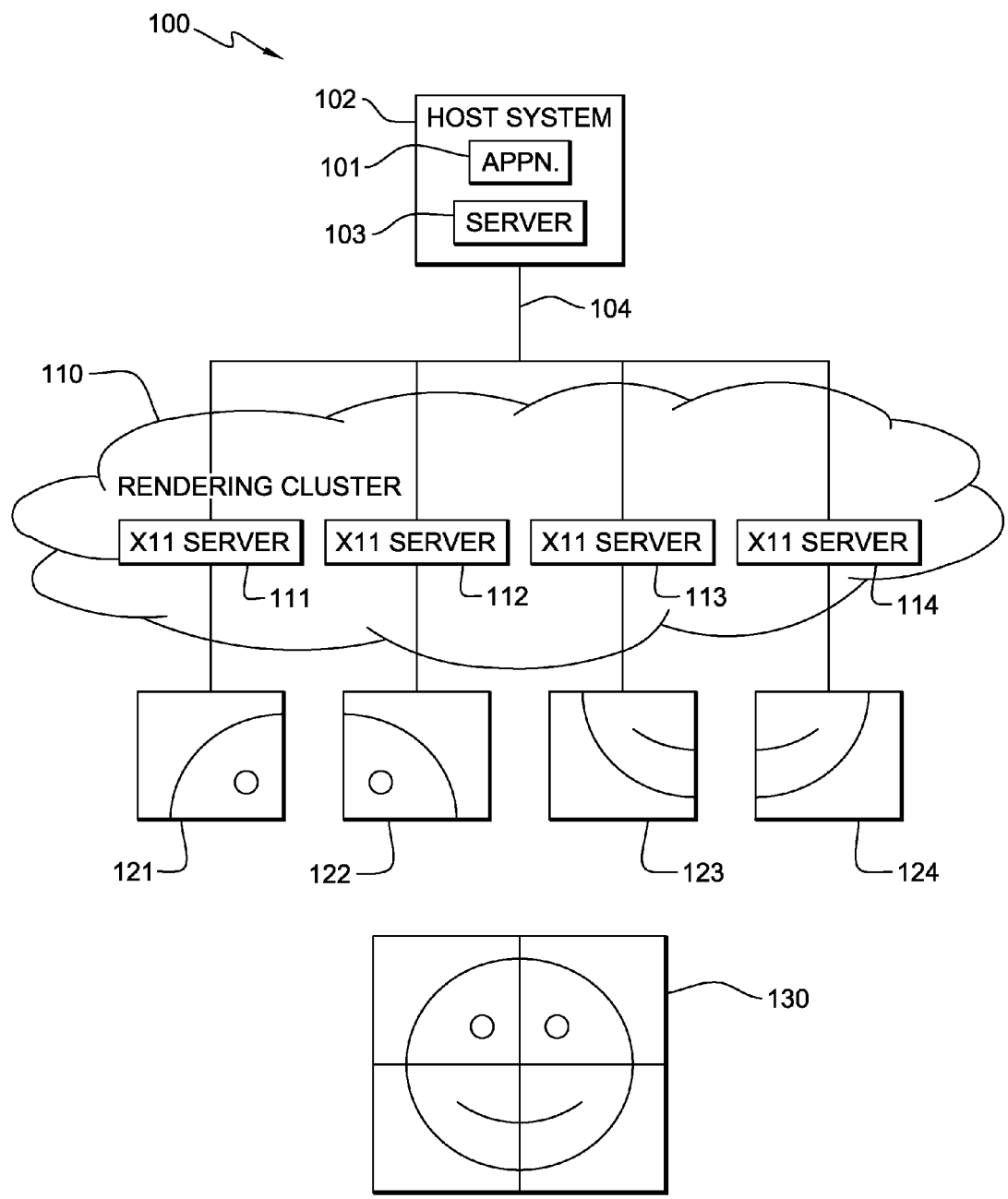
FIG. 5 shows a data processing system in which an embodiment of the invention may be implemented.

FIG. 5 shows a processing system 100 in which the present invention may be embodied. The system 100 includes a software application 101 running on a host data processing system 102. The application 101 uses a local display server 103. The display server 103 of the application 101 is virtualized through the use of a local network 104

(usually Ethernet) linking to a rendering cluster 110 comprising a plurality of X servers 111-114. Each of the X servers 111-114 is used to draw a portion of the graphics output on individual displays 121-124.

The display server 103 accepts standard X11 calls make by the application 101, encodes them, and performs the same X11 function call onto each node of the cluster 110 of rendering servers 111-114. Each member of the cluster 110 receives the X11 function call data and draws its portion of the final image in parallel. Each rendering server 111-114 displays a portion 121-124 of the image. This may be, for example, as a tile of a display wall or projection system.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true scope of the present invention.

What is claimed is:

1. A method of managing graphics load balancing strategies, comprising:
   using a plurality of rendering servers to render concurrently a multitude of graphics frames for a display area on a display device, wherein each of the rendering servers has an associated workload;
   identifying a plurality of load balancing strategies for balancing the workloads on the rendering servers, each of the load balancing strategies being a respective one technique for partitioning the display area into a plurality of smaller regions and assigning said plurality of smaller regions of the display area to the rendering servers; and
   dynamically switching among the plurality of the load balancing strategies over a period of time to re-balance the workloads on the rendering servers, including
   using a system controller to implement the load balancing strategies, and
   using a manager to select different ones of the load balancing strategies for implementation at different times in said period of time and for communicating the selected load balancing strategies to the system controller; and wherein:
   the system controller accepts new load balancing strategies from a user, and passes information to the manager, said information including display configuration performance statistics for each server and user-defined load balancing policy information; and
   the manager obtains the performance statistics for each server from the system controller, obtains updated display configuration information from the system controller, adds or removes load balancing strategies and rendering servers, determines when a new load balancing strategy is to be implemented, provides an initial display tile partitions and assignments for each of the rendering servers, and repartitions, resizes and reassigns the partitions based on the performance feedback and the one of the load balancing strategies in use.

2. The method according to claim 1, wherein the selecting another one of the load balancing strategies includes changing from said one of the load balancing strategies to said another one of the load balancing strategies in real time.

3. The method according to claim 1, wherein data are sent between the rendering servers, and the performance statistics includes the time it takes to send data between the rendering servers.

4. The method according to claim 1, wherein said performance statistics includes application usage patterns, the size and nature of the data being rendered, the display configuration, and the amount and type of rendering resources that are available.

5. The method according to claim 1, wherein said performance statistics includes one or more user defined metrics.

6. The method according to claim 1, wherein the identifying includes a user providing one or more of the load balancing strategies.

7. The method according to claim 1, wherein:
   the using a plurality of rendering servers includes said plurality of servers rendering the multitude of graphics frames at a defined rate;
   the using a manager to select different ones of the load balancing strategies includes switching from one of the load balancing strategies to another one of the load balancing strategies without affecting said defined rate; and
   said defined rate is a constant rate.

8. The method according to claim 1, wherein:
   one of the strategies reassigns the partitions, on a per-frame basis, based on rendering times of each rendering server; and
   when said one of the strategies is in use, the manager, under specified conditions, switches to another one of the strategies that assigns the partitions and does not reassign the partitions.

9. The method according to claim 1, wherein:
   the using a plurality of rendering servers includes executing a collection of processes by the rendering servers to render the graphics frame, including assigning one or more of the regions of the display area to each of the processes;
   the System Controller sends to the Manager information describing a display configuration, performance statistics for each server and user-defined load balancing policy information; and
   the Manager sends to the System Controller information describing a number of processes that each server is responsible for, an identification of the one of the servers that is responsible for each process, and tile parameters associated with each process.

10. A data processing system for managing graphics load balancing strategies, comprising:
    a plurality of rendering servers to render a multitude of graphics frames for a display area on a display device, wherein each of the rendering servers has an associated workload;
    a rendering servers controller for identifying a plurality of load balancing strategies for balancing the workloads on the rendering servers, for using one of the load balancing strategies to balance the workloads on the rendering servers, and for monitoring one or more defined metrics, each of the load balancing strategies being a respective one technique for partitioning the display area into a plurality of smaller regions and assigning said plurality of smaller regions of the display region to the rendering servers; and
    a load balancing policies manager for dynamically switching among the plurality of the load balancing strategies over a period of time to re-balance the workloads on the rendering servers including acting, in response to a defined change in said one or more defined metrics, to select another one of the load balancing strategies, and wherein, in response to said selection, the rendering servers controller switches from said one of the load balancing strategies to said another one of the load balancing strategies and reassigns the regions of the display area among the rendering servers to balance the workloads on the rendering servers; and wherein:
the rendering servers controller accepts new load balancing strategies from a user, and passes information to the load balancing policies manager, said information including display configuration performance statistics for each server and user-defined load balancing policy information;
the load balancing policies manager obtains the performance statistics for each server from the rendering servers controller, obtains updated display configuration information from the system controller, adds or removes load balancing strategies and rendering servers, determines when a new load balancing strategy is to be implemented, provides an initial display tile partitions and assignments for each of the rendering servers, and repartitions, resizes and reassigns the partitions based on the performance feedback and the one of the load balancing strategies in use.

11. The data processing system according to claim 10, wherein the load balancing policies manager selects said another one of the load balancing strategies and the rendering servers controller changes from said one of the load balancing strategies to said another one of the load balancing strategies in real time.

12. The data processing system according to claim 10, wherein said one or more of the defined metrics includes performance statistics for the rendering servers.

13. The data processing system according to claim 10, wherein data are sent between the rendering servers, and the one or more of the defined metrics includes the time it takes to send data between the rendering servers.

14. The data processing system according to claim 10, wherein:
the rendering servers rendering the multitude of graphics frames at a defined rate; and
the load balancing policies manager selects said another one of the load balancing strategies, and the rendering servers controller uses said another one of the load balancing strategies without affecting said defined rate; said defined rate is a constant rate.

15. An article of manufacture comprising at least one tangible computer usable hardware device having computer readable program code logic tangibly embodied therein to execute a machine instruction in one or more processing units for managing graphics load balancing strategies, said computer readable program code logic, when executing, performing the following steps:
using a plurality of rendering servers to render a multitude of graphics frames for a display area on a display device, wherein each of the rendering servers has an associated workload;
identifying a plurality of load balancing strategies for balancing the workloads on the rendering servers, each of the load balancing strategies being a respective one technique for partitioning the display area into a plurality of smaller regions and assigning said plurality of smaller regions of the display region to the rendering servers; and
dynamically switching among the plurality of the load balancing strategies over a period of time to re-balance the workloads on the rendering servers, including
using a system controller to implement the load balancing strategies, and
using a manager to select different ones of the load balancing strategies for implementation at different times in said period of time and for communicating the selected load balancing strategies to the system controller; and wherein:
the system controller accepts new load balancing strategies from a user, and passes information to the manager, said information including display configuration performance statistics for each server and user-defined load balancing policy information;
the manager obtains the performance statistics for each server from the system controller, obtains updated display configuration information from the system controller, adds or removes load balancing strategies and rendering servers, determines when a new load balancing strategy is to be implemented, provides an initial display tile partitions and assignments for each of the rendering servers, and repartitions, resizes and reassigns the partitions based on the performance feedback and the one of the load balancing strategies in use.

16. The article of manufacture according to claim 15, wherein the using a manager to select different ones of the load balancing strategies includes changing from said one of the load balancing strategies to said another one of the load balancing strategies in real time.

17. The article of manufacture according to claim 15, wherein said performance statistics includes application usage patterns, the size and nature of the data being rendered, the display configuration, and the amount and type of rendering resources that are available.

18. A method of managing graphics load balancing strategies in a data processing system comprising a plurality of rendering servers to render a multitude of graphics frames for a display area on a display device, wherein each of the rendering servers has an associated workload, the method comprising:
selecting one of a group of load balancing strategies, each of the load balancing strategies being a respective one technique for partitioning the display area into a plurality of small regions and assigning said plurality of smaller regions of the display area to the rendering servers;
dynamically switching among the plurality of the load balancing strategies over a period of time to re-balance the workloads on the rendering servers including
using a system controller to implement the load balancing strategies, and
using a manager to select different ones of the load balancing strategies for implementation at different times in said period of time and for communicating the selected load balancing strategies to the system controller; and wherein:
the system controller accepts new load balancing strategies from a user, and passes information to the manager, said information including display configuration performance statistics for each server and user-defined load balancing policy information; and
the manager obtains the performance statistics for each server from the system controller, obtains updated display configuration information from the system controller, adds or removes load balancing strategies and rendering servers, determines when a new load balancing strategy is to be implemented, provides an initial display tile partitions and assignments for each of the rendering servers, and repartitions, resizes and reassigns the partitions based on the performance feedback and the one of the load balancing strategies in use.

19. The method according to claim 18, wherein the using a manager to select different ones of the load balancing strategies includes changing from said one of the load balancing strategies to said another one of the load balancing strategies in real time.

20. The method according to claim 18, wherein said performance statistics includes performance statistics for the rendering servers, application usage patterns, the size and nature of the data being rendered, the display configuration, and the amount and type of rendering resources that are available.

* * * * *